United States Patent
Tada et al.

(10) Patent No.: US 8,038,559 B2
(45) Date of Patent: Oct. 18, 2011

(54) POWER TRANSMISSION CHAIN, METHOD FOR MANUFACTURING POWER TRANSMISSION MEMBER OF THE POWER TRANSMISSION CHAIN, AND POWER TRANSMISSION DEVICE

(75) Inventors: Seiji Tada, Kashiba (JP); Shigeo Kamamoto, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 107 days.

(21) Appl. No.: 11/882,706

(22) Filed: Aug. 3, 2007

(65) Prior Publication Data
US 2008/0051235 A1    Feb. 28, 2008

(30) Foreign Application Priority Data
Aug. 4, 2006    (JP) ................................ P2006-213881

(51) Int. Cl.
*F16H 7/06*    (2006.01)
(52) U.S. Cl. ........ 474/155; 474/202; 474/206; 474/212; 474/213; 474/215; 474/219; 474/229; 474/242; 59/1; 59/6; 59/7; 59/29; 59/35.1
(58) Field of Classification Search .................. 474/155, 474/8, 206; *F16G 5/18*
See application file for complete search history.

(56) References Cited

U.S. PATENT DOCUMENTS

| | | | |
|---|---|---|---|
| 4,276,041 A | 6/1981 | Steuer | |
| 4,795,406 A | 1/1989 | Dittrich et al. | |
| 5,328,412 A * | 7/1994 | Durum | ................... 474/8 |
| 5,399,116 A * | 3/1995 | Ellis et al. | ..................... 451/540 |
| 5,728,021 A * | 3/1998 | van Rooij et al. | ............. 474/229 |
| 6,293,887 B1 * | 9/2001 | Linnenbrugger et al. | .... 474/245 |
| 6,793,564 B1 * | 9/2004 | Lupi | ............................. 451/178 |
| 2004/0152549 A1 * | 8/2004 | Nishimoto et al. | ........... 474/214 |
| 2006/0030442 A1 * | 2/2006 | Hubertus Maria van Rooij et al. | ............................. 474/215 |
| 2007/0082517 A1 * | 4/2007 | Lou et al. | ......................... 439/79 |
| 2007/0264916 A1 * | 11/2007 | Miura et al. | ................... 451/282 |

FOREIGN PATENT DOCUMENTS

| | | |
|---|---|---|
| DE | 100 03 131 A 1 | 8/2000 |
| EP | 1 443 242 A2 | 8/2004 |
| JP | 55-65747(A) | 5/1980 |
| JP | 57-83353 | 5/1982 |
| JP | 61-25761 | 2/1986 |
| JP | 2005-308108 | 11/2005 |
| WO | WO 2005/045280 A1 | 5/2005 |
| WO | WO 2006/043605 A1 | 4/2006 |

OTHER PUBLICATIONS

Japanese Office Action issued May 19, 2011 with an English-language translation thereof.

* cited by examiner

*Primary Examiner* — Robert Siconolfi
*Assistant Examiner* — San Aung
(74) *Attorney, Agent, or Firm* — McGinn IP Law Group, PLLC (57) ABSTRACT

The end faces of a first pin contain bulging curved faces having an egg-like shape, when viewed along a chain width direction. Each bulging curved face includes a first end portion, a second end portion and a maximum width portion with respect to a chain advancing direction. With respect to perpendicular directions, the distance between the center of the maximum width portion and the first end portion is relatively large, whereas the distance between the center of the maximum width portion and the second end portion is relatively short. It is possible to enlarge the surface area of the bulging curved face.

15 Claims, 7 Drawing Sheets

POWER TRANSMISSION CHAIN, METHOD FOR MANUFACTURING POWER TRANSMISSION MEMBER OF THE POWER TRANSMISSION CHAIN, AND POWER TRANSMISSION DEVICE

BACKGROUND OF THE INVENTION

1. Field of the Invention

The present invention relates to a power transmission chain, a method for manufacturing a power transmission member of the power transmission chain, and a power transmission device.

2. Related Art

In an endless power transmission chain to be used in a power transmission device such as a pulley type continuously variable transmission (CVT) of an automobile, links adjoining in a chain advancing direction are connected by pins and inter-pieces (as referred to Pamphlet of International Publication No. WO 2005/045280 A1, for example). The paired end faces of the pins engage with the corresponding taper disks of the pulleys thereby to transmit the power.

The end face of the pin is tapered the more as the pin advances from the intermediate portion of the chain radial direction to the end portion on the outer side, so that the outer side end portion has a smaller area. As a result, when the end faces contacts with the taper disk, only the portion on the inner side of the edge (or edge portion) of the end face cannot retain a sufficient contact area thereby to cause a possible edge abutment, in which even the edge contacts with the taper disk. When the edge abutment occurs, the wear of the end face is undesirably promoted locally.

SUMMARY OF THE INVENTION

The invention has been conceived in this background, and has an object to provide a power transmission chain capable of preventing the edge abutment, in which the edge portions of the pin contact with the pulley, a method for manufacturing a power transmission member of the power transmission chain, and a power transmission device.

In order to achieve the above-specified object, according to the invention, there is provided a power transmission chain (1) comprising a plurality of links (2) arranged in a chain advancing direction (X), and a plurality of connecting members (50) arranged in a chain width direction (W) perpendicular to the chain advancing direction (X) for connecting the links (2) in a mutually bendable manner, said connecting members (50) include power transmission members (3) having end faces (17) engaging in a power transmittable manner with the sheave faces (62a and 63a, and 72a and 73a) of pulleys (60, 70); in that said end faces (17) include bulging curved faces (21) having first and second end portions (22, 23) with respect to perpendicular directions (V) perpendicular to the chain advancing direction (X) and the chain width direction (W); and said bulging curved faces (21) are formed in such an egg shape, when viewed along the chain width direction (W), maximum width portions (24) of the bulging curved faces (21) with respect to the chain advancing direction (X) and the first end portions (22) are relatively distant, and the maximum width portions (24) and the second end portions (23) are relatively near.

Here, the parenthesized numerals indicate the corresponding components or the like in the later-described mode of embodiments. These indications are likewise applied to the following paragraphs.

According to the invention, it is possible to enlarge the surface area of the bulging curved faces sufficiently. The contacting area between the bulging curved faces and the sheave faces of the pulleys can be sufficiently retained to receive the loads from the sheave faces of the pulleys in the bulging curved faces. The sheave faces can be prevented from contacting with the edges (or the edge portions) of the end faces of the power transmission members thereby to prevent the edge abutment so that the advance of the wear of the end faces of the power transmission members can be drastically reduced.

In the invention, moreover, the power transmission chain may be constituted such that said first end portions (22) are end portions corresponding to the outer sides of pulley radial directions (RP1, RP2). In this case, the edge abutments can be prevented, even in case those end portions of the end faces of the power transmission members, which correspond to the outer sides of the pulley radial directions, are thinned in the chain advancing direction.

In the invention, moreover, the power transmission chain may be constituted such that a line of intersection (K1) between an arbitrary plane (k) containing a predetermined reference axis (M) ands aid bulging curved faces (21) is formed into an arcuate shape having a single radius of curvature (Rg) on said arbitrary plane (k), and such that said predetermined reference axis (M) is arranged close to the first end portions (22) and outside of the connecting members (50) and extends in the chain width direction (W). By forming the line of intersection of the bulging curved faces, the bulging curved faces can be formed on the end faces of the power transmission members.

In the invention, moreover, the power transmission chain may be constituted to comprise kinematic pair members (4) pairing said power transmission members (3), such that said power transmission members (3) and the kinematic pair members (4) make rolling/sliding contact with each other at contact portions (T) which move as the links (2) are bent, such that said power transmission members (3) include a plurality of kinds of members (3a and 3b) arrayed at random in the chain advancing direction (X), such that said plural kinds of members (3a and 3b) have first members (3a) made relatively thin with respect to the chain advancing direction (X), and second members (3b) made relatively thick with respect to the chain advancing direction (X), and such that the moving loci of the contact portions (T) are different between the plural kinds of members (3a and 3b).

In this case, the meshing periods for the individual power transmission members to be sequentially meshed with the pulleys are made random so that the frequency of these meshing noises can be distributed over a wide range thereby to reduce the peak value. As a result, it is possible to drastically reduce the noises accompanying the drive of the power transmission chain. Moreover, even the end faces of the first members thinned can contact with the sheave faces of the pulleys in the bulging curved faces thereby to prevent the edge abutments against the sheave faces.

According to the invention, there is provided a method for manufacturing a power transmission members (3) for said power transmission chain (1), comprising: rotating a grinding wheel (34) having a pair of grinding faces (39) for grinding a pair of end faces (33) of a manufacture intermediate (31) of a rod-shaped power transmission member simultaneously; rotating a carrier (32) for holding said manufacture intermediate (31) in parallel with the axis of rotation (34a) of said grinding wheel (34), on the axis of rotation (32a) parallel to the axis of rotation (34a) of the grinding wheel (34); and passing the paired end faces (33) of the manufacture intermediate (31) between said paired grinding faces (39). In this case, by the simple method for passing the manufacture intermediate of the power transmission members through the paired grinding faces, the bulging curved faces can be simultaneously formed on the end faces of the power transmission members thereto to reduce the dispersion of the whole lengths of the power transmission members.

According to the invention, there is provided a power transmission device comprising: first and second pulleys (60 and 70) including a pair of sheave faces (62a and 63a, and 72a and 73a) of a conical shape confronting each other; and said power transmission chain (1) made to run between those pulleys (60 and 70) for transmitting the power in engagement with the sheave faces (62a and 63a, and 72a and 73a). In this case, it is possible to realize the power transmission device, which is excellent in durability while suppressing the wears of the power transmission members and the wears of the sheave faces.

DETAILED DESCRIPTION OF THE PREFERRED EMBODIMENTS

Preferred modes of embodiment of the invention are described with reference to the accompanying drawings.

Figure 1:
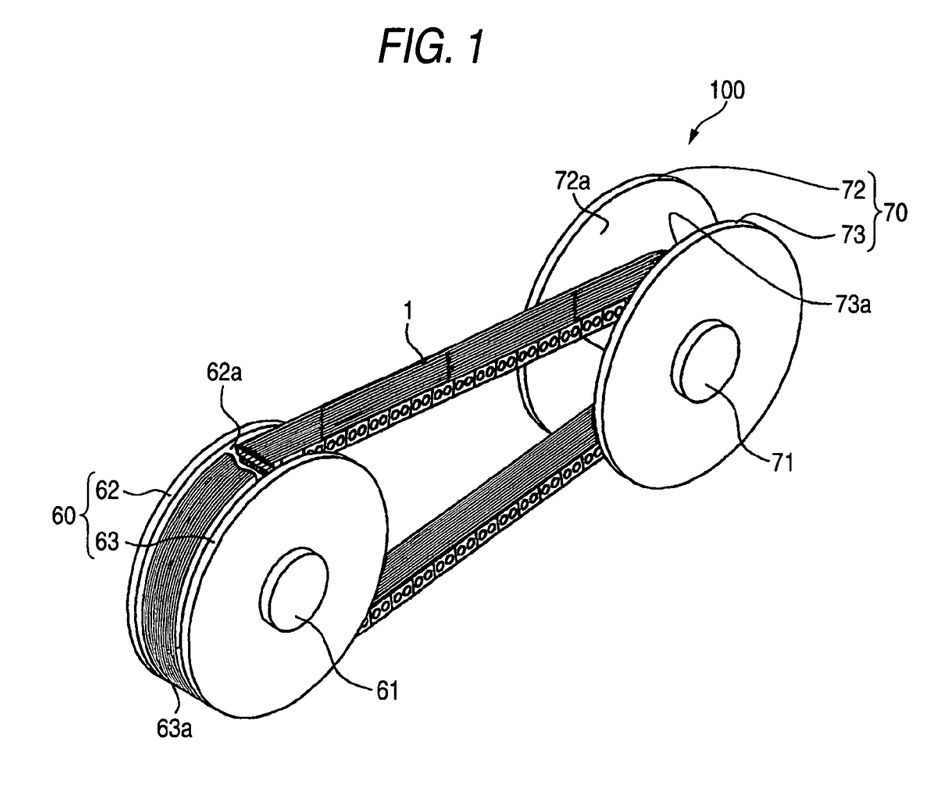
FIG. 1 is a perspective view schematically showing an essential constitution of a chain type continuously variable transmission as a power transmission device, which is equipped with a power transmission chain according to one mode of embodiment of the invention.

FIG. 1 is a perspective view schematically showing an essential constitution of a chain type continuously variable transmission (as will also be merely called the "continuously variable transmission") as a power transmission device, which is equipped with a power transmission chain according to one mode of embodiment of the invention. With reference to FIG. 1, a continuously variable transmission 100 is mounted on a vehicle such as an automobile, and is constituted to include: a first pulley or a drive pulley 60 made of a metal (e.g., structural steel); a second pulley or a driven pulley 70 made of a metal (e.g., structural steel); and an endless power transmission chain 1 (as will be merely called the "chain") wound between those two pulleys 60 and 70. Here, the chain 1 in FIG. 1 is shown so partially sectionally as can be easily understood.

Figure 2:
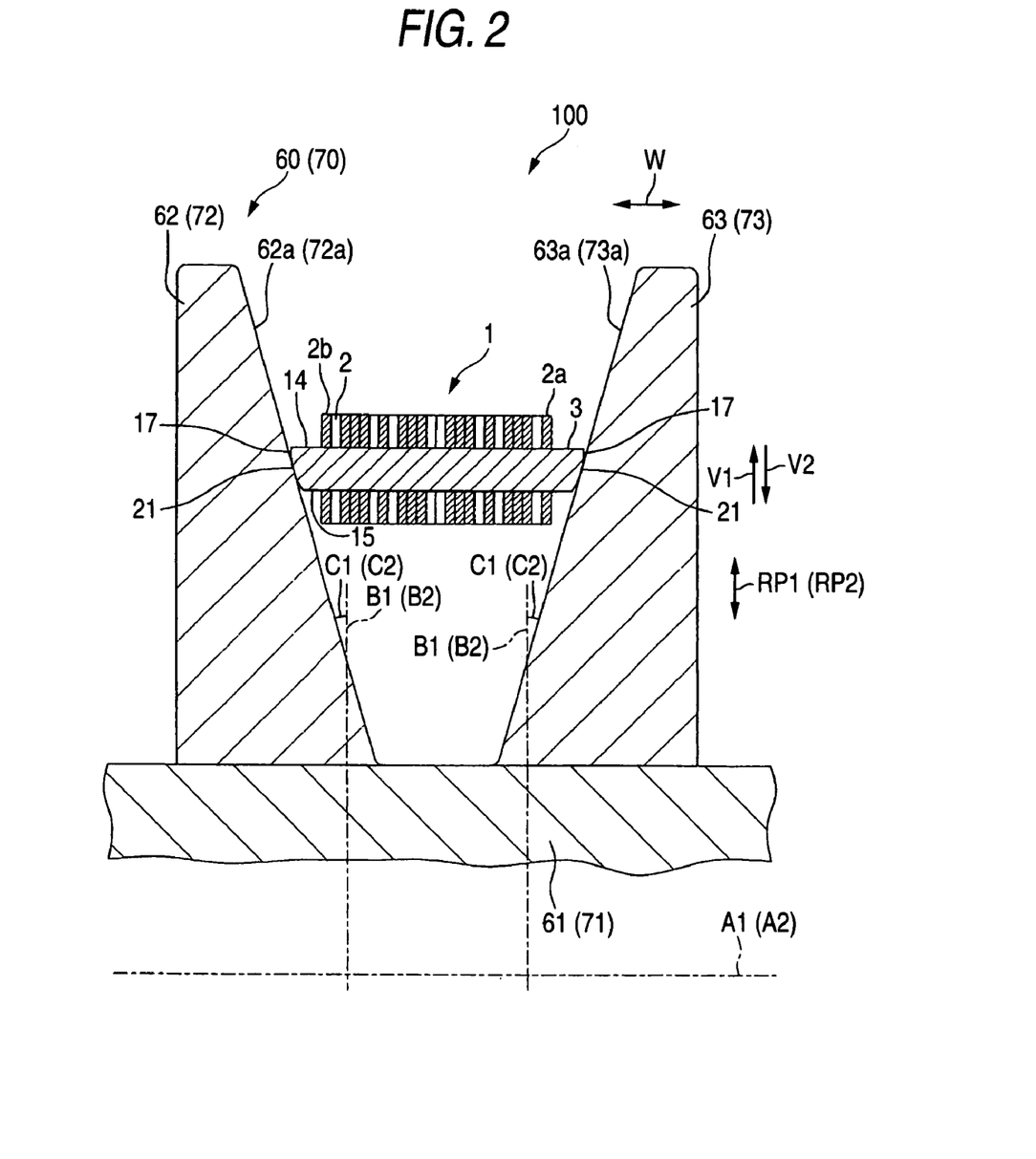
FIG. 2 is a partially enlarged sectional view of a drive pulley (or a driven pulley) and a chain of FIG. 1.

FIG. 2 is a partially enlarged sectional view of the drive pulley 60 (or the driven pulley 70) and the chain 1 of FIG. 1. With reference to FIG. 1 and FIG. 2, the drive pulley 60 is mounted integrally rotatably on an input shaft 61 connected in a power transmitting manner to the drive source of the vehicle, and is equipped with a stationary sheave 62 and a movable sheave 63. These stationary sheave 62 and movable sheave 63 have a pair of sheave faces 62a and 63a, respectively, which confront each other. The individual sheave faces 62a and 63a contain conical slopes.

The individual sheave faces 62a and 63a are inclined with respect to planes B1 normal to the center axis A1 of the drive pulley 60, and an angles (i.e., a pulley half angle C1) made between the generating lines of the individual sheave faces 62a and 63a and the aforementioned planes B1 are set to 11 degrees, for example. These sheave faces 62a and 63a define a groove, by which the chain 1 is clamped and held by a strong pressure.

To the movable sheave 63, moreover, there is connected a (not-shown) hydraulic actuator for changing the groove width. At a speed changing time, the groove width is varied by moving the movable sheave 63 in the axial direction (rightward or leftward of FIG. 2) of the input shaft 61. As a result, the chain 1 is moved in the radial direction (upward or downward of FIG. 2) of the input shaft 61 so that the effective radius of the pulley 60 for the chain 1 can be varied.

On the other hand, the driven pulley 70 is mounted integrally rotatably to an output shaft 71, which leads in a power transmittable manner to the (not-shown) drive wheel, as shown in FIG. 1 and FIG. 2. Like the drive pulley 60, the driven pulley 70 is equipped with a stationary sheave 73 and a movable sheave 72, respectively, which have a pair of confronting sheave faces 73a and 72a confronting each other for forming a groove to hold the chain 1 under a high pressure.

The individual sheave faces 73a and 72a are inclined with respect to a plane B2 normal to the center axis of the driven pulley 70, and an angle (i.e., a pulley half angle C2) made between the generating lines of the individual sheave faces 73a and 72a and the planes B2 is set to 11 degrees, for example. The pulley half angle C1 of the drive pulley 60 is equal to the pulley half angle C2 of the driven pulley 70 (i.e., C1=C2).

To the movable sheave 72 of the driven pulley 70, like the movable sheave 63 of the drive pulley 60, there is connected a (not-shown) hydraulic actuator, so that the groove width is varied at a speed changing time by moving that movable sheave 72. As a result, the radius of the pulley 70 effective for the chain 1 can be varied by moving the chain 1.

Figure 3:
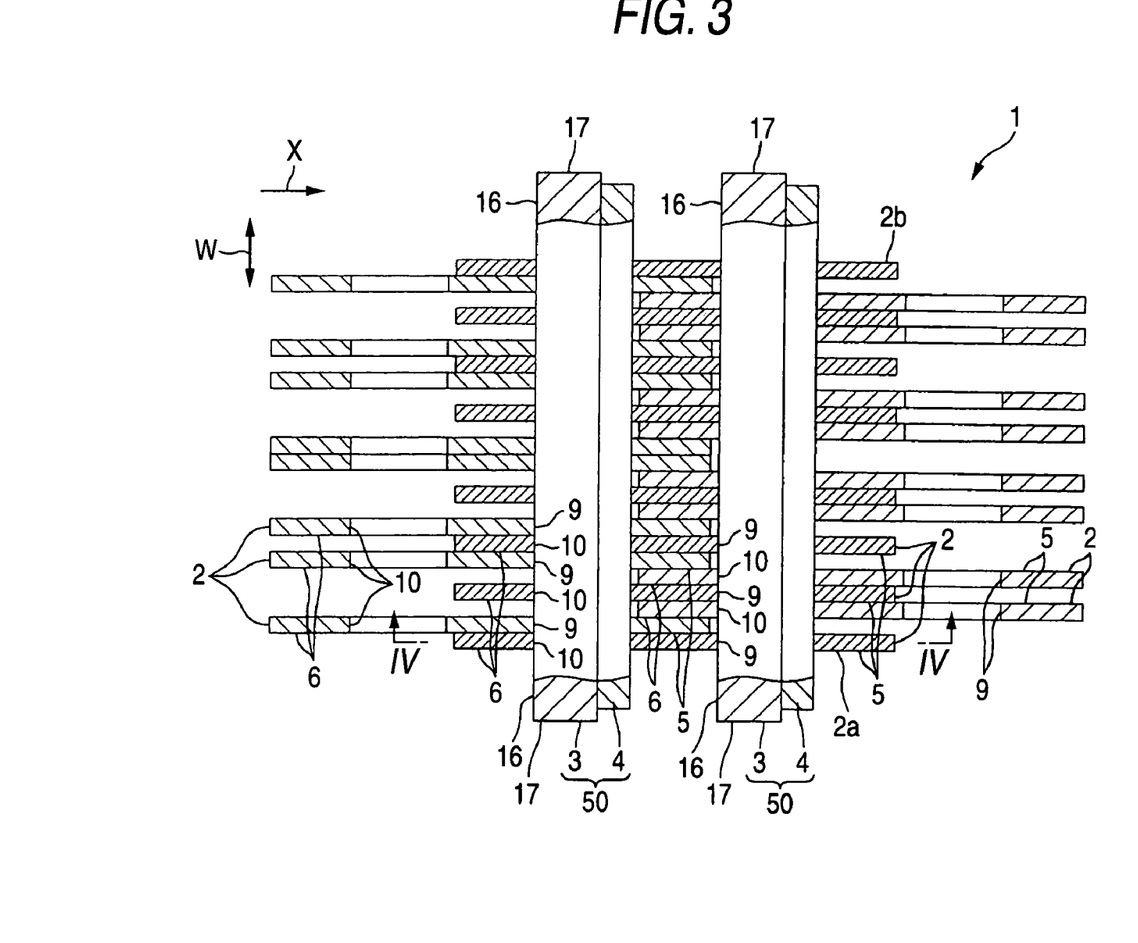
FIG. 3 is a perspective view of an essential portion of the chain.
Figure 4:
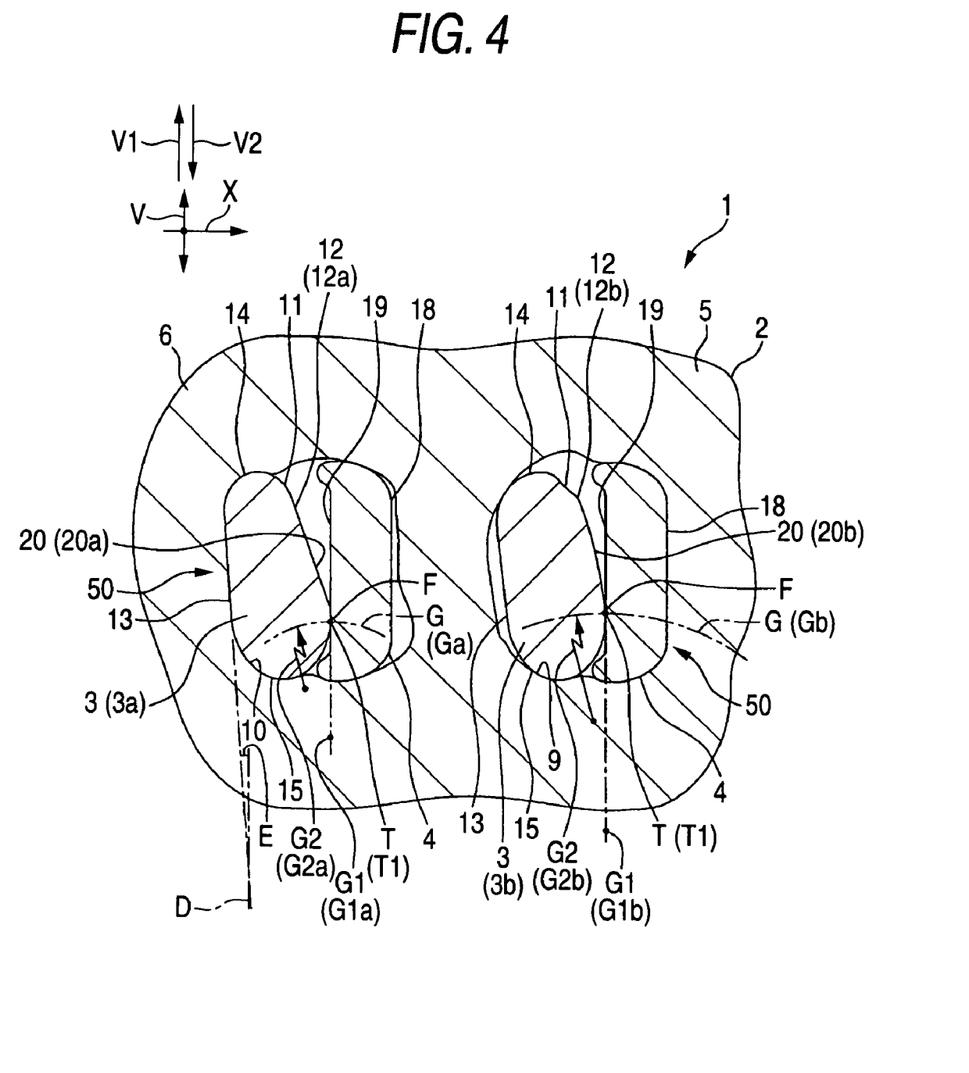
FIG. 4 is a sectional view taken along line IV-IV of FIG. 3.

FIG. 3 is a sectional view of an essential portion of the chain 1. FIG. 4 is a sectional view taken along line IV-IV of FIG. 3.

With reference to FIG. 3 and FIG. 4, the chain 1 is equipped with a plurality of links 2, and a plurality of connecting members 50 for connecting those links 2 in a mutually bendable manner.

In the following: the direction parallel to the advancing direction of the chain 1 is called the chain advancing direction X; that of the directions perpendicular to the chain advancing direction X, which extends along the longitudinal direction of the connecting members 50, is called the chain width direction W; and the directions perpendicular to both the chain advancing direction X and the chain width direction W are called the perpendicular directions V.

Each link 2 is a member formed into a sheet shape and made of a steel sheet, and includes a front end portion 5 and a rear end portion 6 or a pair of end portions arranged ahead and behind of the chain advancing direction X. Individually in the front end portions 5 and the rear end portions 6, there are formed front through holes 9 as first through holes and rear through holes 10 as second through holes. The links 2 are arranged in both the chain advancing direction X and the chain width direction W.

The links 2 adjoining in the chain advancing direction X are made to correspond to each other such that the front through hole 9 of the link 2 relatively positioned on the rear side in the chain advancing direction X and the rear through hole 10 of the link 2 relatively positioned on the front side are juxtaposed to each other in the chain width direction W. By the connecting members 50 threading those corresponding through holes 9 and 10, the links 2 adjoining in the chain advancing direction X are bendably connected to form the chain 1 having an endless shape as a whole.

Each of the connecting members 50 includes a first pin 3 as a power transmission member and a second pin 4 as a kinematic pair member. The first pin 3 and the second pin 4 form a pair with each other The aforementioned paired first and second pins 3 and 4 make a rolling/sliding contact with each other as the corresponding links 2 are bent. The rolling/sliding contact is the contacting state containing at least one of the rolling contact and the sliding contact.

The first pin 3 is a long member elongated in the chain width direction W, and has a length of about 2.5 mm to 4.0 mm in the chain advancing direction X and a length of about 5.5 mm to 8.0 mm in the perpendicular directions V.

The periphery 11 of the first pin 3 is formed into a smooth face extending in parallel with the chain width direction W, and includes a front portion 12 as a confronting portion facing forward of the chain advancing direction X, a rear portion 13 facing backward of the chain advancing direction X, and a pair of end portions of one end portion 14 and other end portion 15 confronting each other in the perpendicular directions V.

The front portion 12 confronts the second pin 4 paired, and makes the rolling/sliding contact at a contacting portion T (or a contacting point, as viewed in the chain width direction W) with the later-described rear portion 19 of the second pin 4. The rear portion 13 is made to have a flat face. This flat face 13 has a predetermined angle of inclination E with respect to a plane D normal to the chain advancing direction X. This inclination angle E is set to a value as small as about 5 to 12 degrees so that it can be thought to be substantially zero.

With reference to FIG. 2 and FIG. 4, the one end portion 14 constitutes that end portion of the periphery 11, which is located on one side V1 of the perpendicular directions V or radially outward of the radial directions RP1 and RP2 of the pulleys 60 and 70. The other end portion 15 constitutes that end portion of the periphery 11, which is located on the other side V2 of the perpendicular directions V or radially inward of the radial directions RP1 and RP2 of the pulleys 60 and 70.

A pair of end portions 16 in the longitudinal direction of the first pin 3 are protruded outward of the chain width direction W with respect to those links 2a and 2b of each link 2, which are arranged at the paired end portions in the chain width direction W. End faces 17 are formed on those paired end portions 16.

In the periphery 11 of the first pin 3, the one end portion 14 is made wider in the chain width direction W than the other end portion 15. The paired end faces 17 make frictional contact (or engagement) with the corresponding sheave faces 62a and 63a, and 72a and 73a of the individual pulleys 60 and 70.

The first pins 3 are clamped between those corresponding sheave faces 62a and 63a, and 72a and 73a so that the power is transmitted between the first pins 3 and the individual pulleys 60 and 70. The first pins 3 are made of a highly strong wear resisting material such as bearing steel (SUJ2) so that their end faces 17 may contribute to direct power transmissions.

As referred to FIG. 3 and FIG. 4, the second pins (as also called the "strips" or "inter-pieces") are long members made of a material similar to that of the first pins 3 and extending in the chain width direction W.

The second pins 4 are made so shorter than the first pins 3 that their paired end portions may not contact with the sheave faces of the individual pulleys, and are arranged ahead of the pairing first pins 3 in the chain advancing direction X.

The second pin 4 has its periphery 18 formed into a smooth face extending in the chain width direction W. This periphery 18 has a rear portion 19 as an opposite portion confronting backward in the chain advancing direction X. In the rear portion 19, an intermediate portion in the perpendicular directions V is formed into a flat face normal to the chain advancing direction X, and confronts the front portion 12 of the pairing first pin 3.

The chain 1 is the so-called "press-fit type chain". In the front through hole 9 of each link 2, more specifically, the corresponding first pin 3 is loosely fitted, and the corresponding second pin 4 is press-fitted and fixed. In the rear through hole 10 of each link 2, the corresponding first pin 3 is press-fitted and fixed, and the corresponding second pin 4 is loosely fitted.

In the constitution thus described, the front portion 12 of the first pin 3 and the rear portion 19 of the second pin 4 make the rolling/sliding contact with each other on the contacting portion T to move as the links 2 adjoining in the chain advancing direction X are bent. Here, the individual first and second pins 3 and 4 may also be loosely fitted in the corresponding front through hole 9 and rear through hole 10.

On the other hand, the chain 1 is the chain of the so-called "involute type". Specifically, a curved portion 20 is formed at the front portion 12 of the first pin 3. The end portion of the curved portion 20 on the other side V2 of the perpendicular directions V is used as a predetermined starting portion F (i.e., a predetermined starting point, as viewed in the chain width direction W).

The position of the starting portion F is located at a contacting portion T1, i.e., at the contacting portion T of the first pin 3 in the straight region of the chain 1. This starting portion F is arranged in the front portion 12 and on the side close to the other end portion 15.

As viewed in the chain width direction W, the curved portion 20 is formed of an involute curve having a predetermined starting portion F (or starting point). This involute curve has a base circle G. This base circle G has a center G1 and a radius G2 (e.g., a base circle radius of 100 mm, for example).

The center G1 is located in a plane normal to the chain advancing direction X and containing the contacting portion T1 of the first pin 3, and is located at a position advancing from the contacting portion T1 to the other side V2 of the perpendicular directions V. The base circle C and the starting portion F intersect with each other.

By the constitution thus far described, as viewed in the chain width direction W, the moving locus of the contacting portion T, as accompanying the bend between the corresponding links 2, is the involute curve with reference to the first pin 3.

Figure 5A:
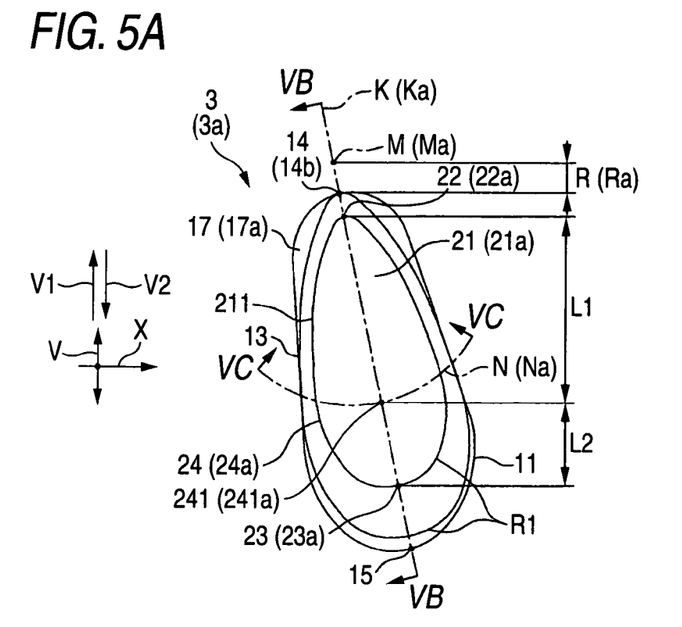
FIG. 5A is a side elevation of a first pin, as viewed along a chain width direction.
Figure 5B:
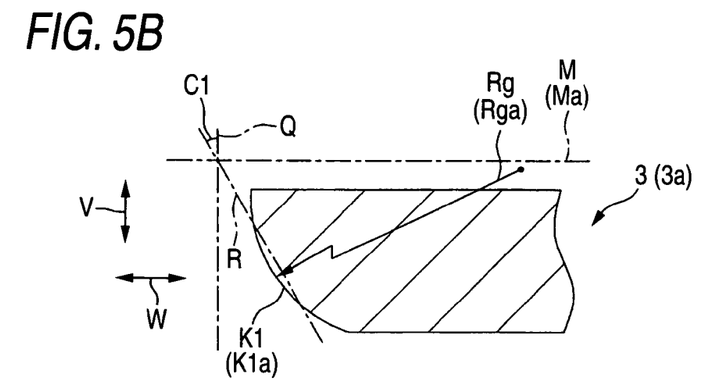
FIG. 5B is a sectional view along line VB-VB of FIG. 5A.
Figure 5C:
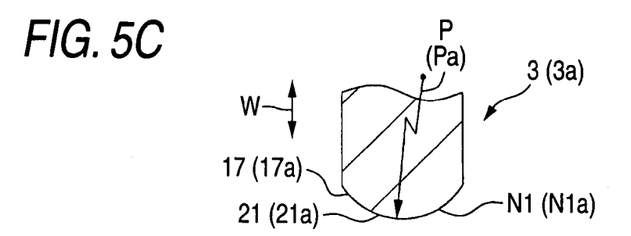
FIG. 5C is a sectional view along line VC-VC of FIG. 5A.

FIG. 5A is a side elevation showing the first pin 3 along the chain width direction W; FIG. 5B is a sectional view taken along line VB-VB of FIG. 5A; and FIG. 5C is a sectional view taken along line VC-VC of FIG. 5A.

With reference to FIG. 2 and FIG. 5A, one of the characteristics of this mode of embodiment is that a bulging curved face 21 is formed on the end face 17 of the first pin 3 and provides a contact area to contact with the corresponding sheave faces 62a and 63a, and 72a and 73a of the individual pulleys 60 and 70.

With reference to FIG. 5A, the bulging curved face 21 is formed into an egg-like shape elongated in the perpendicular directions V, as viewed along the chain width direction W, and is made asymmetric with respect to an arbitrary plane (although not shown) normal to the perpendicular directions V. The bulging curved face 21 includes first and second end portions 22 and 23 in the perpendicular directions V, and a maximum width portion 24, which is the widest with respect to the chain advancing direction X.

The first end portion 22 contains the end portion of the bulging curved face 21 on the one side V1 of the perpendicular directions V, and is close to the one end portion 14 of the periphery 11. The second end portion 23 contains the end portion of the bulging curved face 21 on the other side V2 of the perpendicular directions V, and is close to the other end portion 15 of the periphery 11.

The first end portion 22 and the second end portion 23 intersect with a plane K containing the center 241 of the maximum width portion 24, individually. The first end portion 22, the maximum width portion 24 and the second end portion 23 are arranged on one straight line, when viewed in the chain width direction W. The plane K is parallel to the rear portion 13. With reference to the perpendicular directions V, as viewed along the chain width direction W, the center 241 of the maximum width portion 24 and the first end portion 22 are spaced by a relatively long distance L1, and the center 241 of the maximum width portion 24 and the second end portion 23 are spaced by a relatively short distance L2.

The aforementioned plane K contains a predetermined reference axis M. This reference axis M is arranged outside of the first pin 3 and close to the first end portion 22, and extends along the chain width direction W. As viewed along the chain width direction W, the reference axis M and the one end portion 14 are spaced by a predetermined distance R with reference to the perpendicular directions V.

With reference to FIG. 5A and FIG. 5B, a line of intersection K1 between the arbitrary plane K containing the reference axis M and the end face 17 is formed into an arcuate shape having a single radius of curvature Rg (e.g., 180 mm) in that plane K. Here, FIG. 5B shows the intersection line K1 between the plane K extending through the first and second end portions 22 and 23 and the bulging curved face 21.

With reference to FIG. 5A and FIG. 5C, a line of intersection N1 between an arbitrary arcuate plane N on the center of the radius of curvature of the reference axis M and the end face 17 is formed into an arcuate shape having a single radius of curvature P in that arbitrary arcuate plane N. FIG. 5C shows the intersection line N1 between the arcuate plane N extending through the center 241 of the maximum width portion 24 and the end face 17 as an example.

The curvature radius P of the intersection line N1 becomes the larger as the cylindrical plane N constituting that intersection line N1 moves from the one end portion 14 toward the center 241. Moreover, the curvature radius P of the intersection line N1 becomes the smaller as the cylindrical plane N constituting that intersection line N1 moves from the center 241 toward the other end portion 15. The intersection line (although not shown) between a plane parallel to the chain advancing direction X and the end face 17 does not have a constant radius of curvature in that plane.

With reference to FIG. 5A and FIG. 5B, the intersection line R1 between the arbitrary inclined face R, which is inclined by the same angle C1 as the aforementioned pulley half angle C1 with respect to a plane Q normal to the reference axis M and the end face 17 is identical, in that inclined face R, to either an outer peripheral edge 211 of the bulging curved face 21 or a shape similar to the outer peripheral edge 211 (FIG. 5A shows the intersection line R1 aligned with the outer peripheral edge 211 and the intersection line R1 on the outer side, for example).

With reference to FIG. 4, one of the characteristics of this mode of embodiment resides in that a plurality of kinds of first pins 3 are exemplified by first-kind pins 3a as the first members and second-kind pins 3b as the second members, which are arrayed at random in the chain advancing direction X. Here, FIG. 5A, FIG. 5B and FIG. 5C show the first-kind pins 3a of the first pins, individually.

Figure 6A:
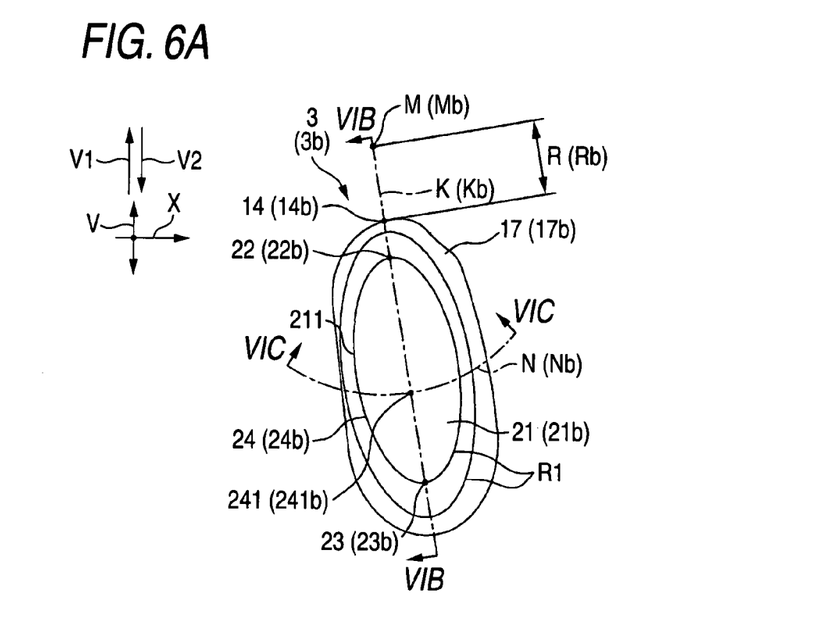
FIG. 6A is a side elevation of a second-kind pin of the first pin, as viewed along a chain width direction.
Figure 6B:
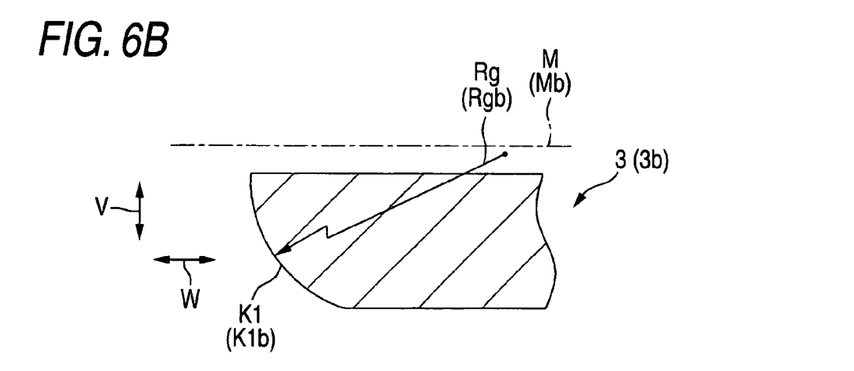
FIG. 6B is a sectional view along line VIB-VIB of FIG. 6A.
Figure 6C:
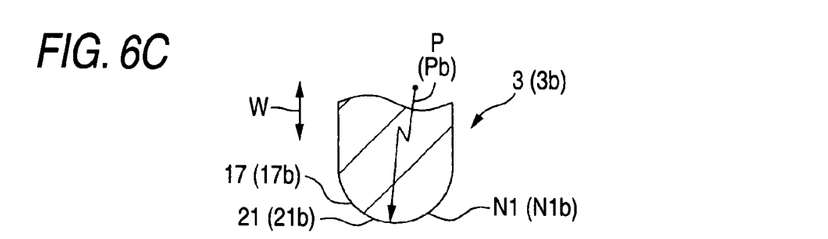
FIG. 6C is a sectional view along line VIC-VIC of FIG. 6A.

FIG. 6A is a side elevation of the second-kind pin 3b of the first pin 3, as taken along the chain width direction W; FIG. 6B is a sectional view along line VIB-VIB of FIG. 6A; and FIG. 6C is a sectional view along line VIC-VIC of FIG. 6A.

The constitution common between the first-kind pins 3a and the second-kind pin 3b has been described in connection with the first pin 3, and the following description is made mainly on the differences between the first-kind pin 3a and the second-kind pin 3b.

With reference to FIG. 5A and FIG. 6A, the portion of the first-kind pin 3a near the end on the one side V1 of the perpendicular directions V is made relatively thin with respect to the chain advancing direction X, and the portion of the second-kind pin 3b near the end on the one side V1 of the perpendicular directions V is made relatively thick with respect to the chain advancing direction X.

As viewed along the chain width direction W, the first-kind pin 3a has a bulging curved face 21a formed longer in the perpendicular directions V than the bulging curved face 21b of the second-kind pin 3b. The distance Ra between one end portion 14a of the first-kind pin 3a and a corresponding reference axis Ma with reference to the perpendicular directions V is shorter than the distance Rb between one end portion 14b of the second-kind pin 3b and a corresponding reference axis Mb with reference to the perpendicular directions V (that is, Ra<Rb).

A radius of curvature Rga of an intersection k1a between an arbitrary plane Ka containing the reference axis Ma and an end face 17a, as shown in FIG. 5A and FIG. 5B, is equal to a radius of curvature Rgb of an intersection k1b between an arbitrary plane Kb containing the reference axis Mb and an end face 17b, as shown in FIG. 6A and FIG. 6B (that is, Rga=Rgb).

A radius of curvature Pa of an intersection N1a between an arcuate plane Na passing through the center 241a of the maximum width portion 24a of the first-kind pin 3a and the end face 17a, as shown in FIG. 5A and FIG. 5C, is made smaller than a radius of curvature Pb of an intersection N1b between an arcuate plane Nb passing through the center 241b of the maximum width portion 24b of the second-kind pin 3b and the end face 17b, as shown in FIG. 6A and FIG. 6C (that is, Pa<Pb).

With reference to FIG. 4, the first- and second-kind pins 3a and 3b are made such that the loci of the rolling/sliding contact of the contacting portion T as the links 2 are bent are made different from each other.

Specifically, the sectional shape of a curved face 20a of the front portion 12a of the first-kind pin 3a is different from that of a curved face 20b of the front portion 12b of the second-kind pin 3b. The radius G2a of a base circle Ga of the involute curve of the section of the curved portion 20a of the first-kind pin 3a is made so relatively small as 40 mm. The radius G2b of a base circle Gb of the involute curve of the section of the curved portion 20b of the second-kind pin 3b is made so relatively large as 54 mm.

With the constitution described above, the locus of the rolling/sliding contact of the contacting portion T of the first-kind pin 3a with reference to the first-kind pin 3a is different from that of the rolling/sliding contact of the contacting portion T of the second-kind pin 3b with reference to the second-kind pin 3b.

As described above, the first- and second-kind pins 3a and 3b are arrayed at random in the chain advancing direction X so that the first pins 3 are made random in the contact period, for which the first pins 3 make sequential contact individually with the individual pulleys.

The "random array" means that at least either the first-kind pins 3a or the second-kind pins 3b are irregularly arranged at least partially of the chain advancing direction X. Here, the word "irregular" means the lack of at least the periodicity and the regularity.

When the first-kind pins 3a are expressed by "a" whereas the second-kind pins 3b are expressed by "b", for example, these pins 3a and 3b are arrayed in such an order in the chain advancing direction X as "a, b, b, a, b, b, b, a, b, b, b, b, a, b, b, b, b, b, b" (although the individual symbols " " are omitted).

The schematic constitution of the continuously variable transmission has been described hereinbefore. The method for forming the end faces 17 of the first pins 3 is described in the following.

Figure 7A:
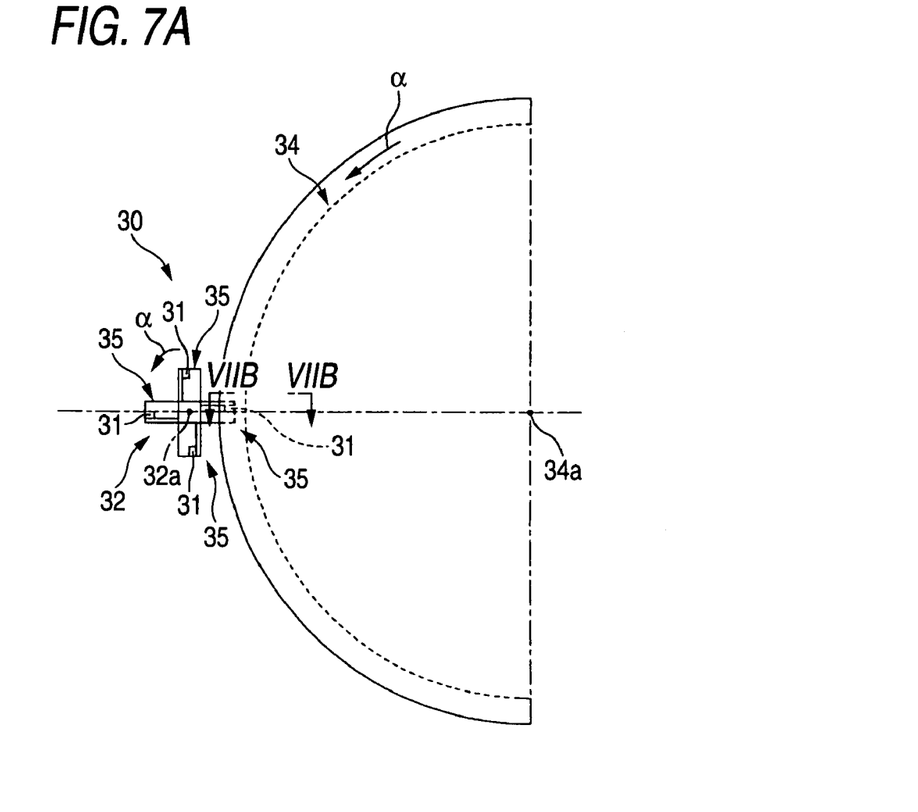
FIG. 7A is a side elevation of an essential portion of a grinding apparatus for grinding and forming the end face of the first pin.
Figure 7B:
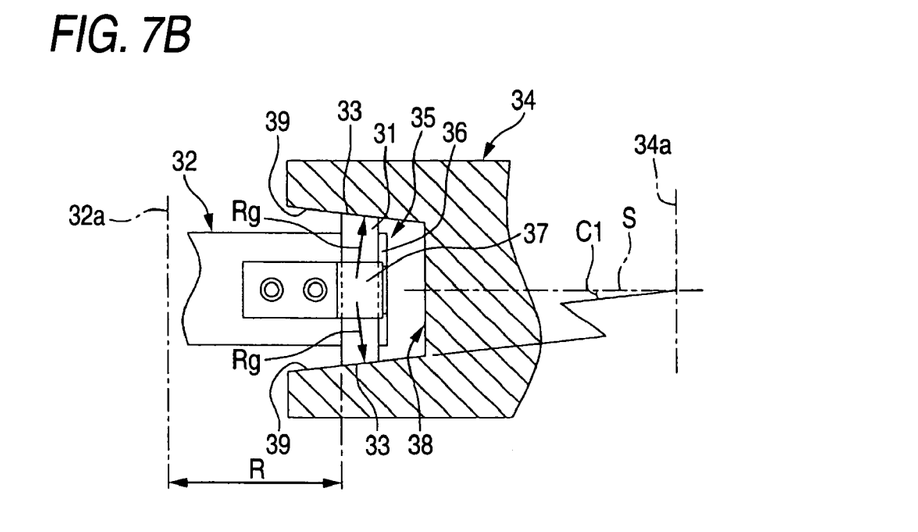
FIG. 7B is a sectional view along line VIIB-VIIB of FIG. 7A.

FIG. 7A is a side elevation of an essential portion of a grinding apparatus 30 for grinding and forming the end faces of the first pins, and FIG. 7B is a sectional view taken along line VIIB-VIIB of FIG. 7A. With reference to FIG. 7A and FIG. 7B, the grinding apparatus 30 is provided with a carrier 32 for holding a manufacture intermediate 31 of the first pin, and a grinding wheel 34 for simultaneously grinding the paired end faces 33 and 33 of the manufacture intermediate 31 held by the carrier 32. The manufacture intermediate 31 is a prepared to have a long rod shape.

The carrier 32 can be rotated on a center axis 32a. The outer circumference portion of the carrier 32 includes a holding portion 35 for holding the longitudinally middle portion of the manufacture intermediate 31 integrally rotatably but not relatively movably. The holding portion 35 holds the manufacture intermediate 31 in parallel with the center axis 32a. The holding portion 35 is provided in plurality (e.g., four) in the circumferential direction of the carrier 32.

Each holding portion 35 includes a holding face 36 for holding the manufacture intermediate 31, and a push member 37 made of an elastic member and associated with the holding face 36 for clamping the manufacture intermediate 31 elastically. The paired end faces 33 and 33 of the manufacture intermediate 31 held by the holding portion 35 are individually protruded axially from the carrier 32.

The grinding wheel 34 is formed into a disc shape, and can be rotated on the center axis 34a. The center axes 32a and 34a are made in parallel with each other. In the vicinity of the outer circumference of the grinding wheel 34, there is formed a circumferential groove 38 having a section of a generally trapezoidal shape. The two axial side walls of the circumferential groove 38 contain grinding faces 39 inclined in a conical face, and are formed symmetrically with each other in the axial direction of the grinding wheel 34.

Each of the grinding faces 39 is given a radius of curvature Rg, which is equal to the aforementioned radius of curvature Rg. A plane S normal to the center axis 34a and the generating line of the grinding face 39 make the same angle C1 as the pulley half angle C1. The radius of curvature of the grinding faces 39 of the grinding wheel 34 is set suitable.

With reference to the radial direction of the carrier 32, as shown in FIG. 5A and FIG. 7, the distance between the center axis 32a and the manufacture intermediate 31 is set to the same value R as the aforementioned distance R between the reference axis M of the first pin 3 and the one end portion 14. As this distance R is the shorter, the bulging curved face 21 formed on the end face 17 of the first pin 3 becomes the longer in the perpendicular directions V.

This distance R is preferred to be 10 mm or less. This is because the radius of curvature near the pin crest portion exceeds 50 mm, as the distance R exceeds 10 mm, so that the edge abutment becomes more probable. Here, the distance R is more preferred to be 5 mm or less. This is because the egg-like shape can be formed more definitely if the distance is 5 mm or less.

With reference to FIG. 7A and FIG. 7B, the paired end faces 33 and 33 of the manufacture intermediate 31 are ground in the following manner. Specifically, the carrier 32 and the grinding wheel 34 are rotationally driven on their individual center axes 32a and 34a in the same direction a by the (not-shown) motor. For example, the rotating speed of the grinding wheel 34 is set constant at a relatively high value, and the rotating speed of the carrier 32 is set to a relatively low value.

The manufacture intermediate 31 held by the holding portion 35 of the carrier 32 passes between the paired grinding faces 39 and 39. As a result, the paired end faces 33 and 33 of the manufacture intermediate 31 are ground in contact with the corresponding grinding faces 39.

As has been described hereinbefore, the following advantages can be attained according to this mode of embodiment. Specifically, the surface area of the bulging curved face 21 can be sufficiently enlarged by providing the egg-like shaped bulging curved face 21 on the first pin 3. The contacting areas between the bulging curved face 21 and the corresponding sheave faces 62a and 63a, and 72a and 73a can be sufficiently retained to bear the loads from the sheave faces 62a and 63a, and 72a and 73a in the bulging curved face 21.

The edge abutment can be prevented by preventing the sheave faces 62a and 63a, and 72a and 73a from contacting with the edges (or edge portions) of the end faces 17 of the first pin 3, so that the progress of the wear of the end faces 17 of the first pin 3 can be drastically reduced. Moreover, the end faces 17 can be prevented from being pried out with respect to the corresponding sheave faces 62a and 63a, and 72a and 73a.

This wear reducing effect is prominently exhibited at the first-kind pins 3a thinned in the chain advancing direction X. Moreover, the facial pressure to act on the end faces 17 of the first pin 3 can be made so low as to lower the loads, thereby to raise the allowable transmission torque and improve the durability.

Moreover, there is no portion, in which the radius of curvature of the end faces 17 abruptly changes, so that the end faces 17 do not abut angularly against the corners of the sheave faces 62a and 63a, and 72a and 73a of the pulleys 60 and 70. Thus, it is possible to reduce the wears of the end faces 17.

Here in the well-known constitution, i.e., in the constitution in which the end faces of the first pins are crowned, the boundaries between the crowned portions and the remaining portions become the portions of inflection, in which the radius of curvature changes relatively largely. These inflection portions may abut angularly against the sheave faces, but are not caused in the first pins 3 of this mode of embodiment.

Moreover, the first end portion 22 is formed to one corresponding to the radially outer portion of the pulley.

As a result, the edge abutment can be prevented even in case that end portion of the end face 17 of the first pin 3, which corresponds to the outside of the pulley radial direction, is thinned in the chain advancing direction X.

In the end face 17 of the first pin 3, moreover, the intersection line K1 between the arbitrary plane K containing the reference axis M and the bulging curved face 21 is formed into the arcuate shape having the single curvature radius Rg so that the bulging curved face 21 can be formed on the end face 17 of the first pin 3.

Moreover, the first pin 3 is exemplified by the first- and second-kind pins 3a and 3b arrayed at random in the chain advancing direction X, the moving loci of the contacting portion T accompanying the bends of the links 2 are made different between the first- and second-kind pins 3a and 3b.

As a result, the meshing periods at the time when the first pins 3 are individually meshed sequentially by the pulleys 60 and 70 are made random. As a result, the distribution of those meshing noises is distributed over a wide range thereby to lower the peak value, so that the noises accompanying the drive of the chain 1 can be drastically reduced.

Moreover, the end faces 17a of the thinned first-kind pins 3a can contact with the corresponding sheave faces 62a and 63a, and 72a and 73a in the bulging curved face 21 so that they can be prevented from performing the edge abutment against the sheave faces 62a and 63a, and 72a and 73a.

Moreover, by the simple method of passing the manufacture intermediate 31 of the first pins between the paired grinding faces 39, the bulging curved faces 21 can be simultaneously formed on the paired end faces 17 of the first pin 3 to reduce the dispersion of the whole length of the first pins 3.

Moreover, the moving locus of the contacting portion T with respect to the first pins 3 is made to draw the involute curve, as viewed in the chain width direction W. This can suppress the chordal vibrations in the chain 1 when the first pins are sequentially meshed by the pulleys 60 and 70. As a result, it is possible to reduce the noises at the driving time of the chain 1.

Thus, the wear of the end faces 17 of the first pins 3 and the wears of the sheave faces 62a and 63a, and 72a and 73a can be suppressed to realize the continuously variable transmission 100 which is excellent in the durability and which can transmit a high torque quietly.

The invention should not be limited to the aforementioned mode of embodiment but can be modified in various manners within the scope of the claims. For example, the invention may be modified such that the first end portion 22 of the bulging curved face 21 contains the end portion on the other side V2 of the perpendicular directions V, and such that the second end portion 23 contains the end portions on the one side V1 of the perpendicular directions V. Moreover, the curvature radius Rg should not be limited to the above-exemplified value but may also be larger or smaller.

In connection with the direction parallel to the chain advancing direction X or the direction parallel to the perpendicular directions V, moreover, the end face 17 of the first pin 3 may be partially crowned.

As viewed in the chain width direction W, moreover, the curved portion 20 of the first pin 3 may also be formed into a curve (e.g., a curve having one or plural radii of curvature) other than the involute curve. Moreover, the invention may also be applied to the so-called "block type power transmission chain", in which members having power transmission portions similar to the end faces of the paired first pins are arranged near the individual paired end portions of the first pins.

Moreover, the invention should not be limited to the mode, in which the groove width of both the drive pulley 60 and the driven pulley 70 is varied, but may also be modified such that only the groove width of one pulley fluctuates whereas the groove width of the other pulley is fixed. Moreover, the description has been made on the aforementioned mode, in which the groove width fluctuates continuously (without any step). However, the invention may also be applied to another power transmission device of stepwise variations or fixed type (without speed change).

What is claimed is:

1. A power transmission chain comprising:
   a plurality of links arranged in a chain advancing direction; and
   a plurality of connecting members arranged in a chain width direction perpendicular to the chain advancing direction for connecting the links in a mutually bendable manner,
   wherein said connecting members include a plurality of power transmission members comprising end faces engaging in a power transmittable manner with sheave faces of pulleys,
   wherein said end faces include bulging curved faces comprising a first end portion and a second end portion with respect to perpendicular directions perpendicular to the chain advancing direction and the chain width direction,
   wherein said bulging curved faces are formed in a half ovate spheroid shape, when viewed along the chain width direction, and maximum width portions of the bulging curved faces with respect to the chain advancing direction and the first end portions are relatively distant, and the maximum width portions and the second end portions are relatively near,
   wherein said first end portions correspond to a plurality of outer sides of a plurality of pulley radial directions,
   wherein a line of intersection between an arbitrary plane containing a predetermined reference axis and said bulging curved faces comprises an arcuate shape comprising a single radius of curvature on said arbitrary plane,
   wherein said predetermined reference axis is arranged close to the first end portions and outside of the connecting members and extends in the chain width direction,
   wherein an intersection line between an arbitrary arcuate plane on a center of the radius of curvature of the reference axis and an end face of the end faces is formed into an arcuate shape comprising a single radius of curvature in the arbitrary arcuate plane,
   wherein the radius of curvature of the intersection line becomes larger as the arcuate plane constituting the intersection line moves from one end portion of the perpendicular directions toward the center of the maximum width portion, and
   wherein the radius of curvature of the intersection line becomes smaller as the cylindrical plane constituting the intersection line moves from the center toward another end portion of the perpendicular directions.

2. A power transmission chain according to claim 1, further comprising:
   a plurality of kinematic pair members pairing with said power transmission members,
   wherein said power transmission members and the kinematic pair members make rolling/sliding contact with each other at contact portions which move as the links are bent, wherein said power transmission members include a plurality of kinds of members arrayed at random in the chain advancing direction, wherein said plural kinds of members include first members and second members comprising a thickness in the chain advancing direction greater than a thickness of the first members in the chain advancing direction, and wherein a moving loci of the contact portions are different between the plural kinds of members.

3. A method For manufacturing power transmission members for a power transmission chain, comprising:

rotating a grinding wheel including a pair of grinding faces for grinding a pair of end faces of a manufacture intermediate of a rod-shaped power transmission member simultaneously, and rotating a carrier for holding said manufacture intermediate in parallel with an axis of rotation of said grinding wheel, on an axis of rotation parallel to the axis of rotation of the grinding wheel; and passing the paired end faces of the manufacture intermediate between said paired grinding faces, the grinding wheel comprising a shape for forming the end portions into the half ovate spheroid shape;

wherein the power transmission chain comprises:

a plurality of links arranged in a chain advancing direction; and the plurality of power transmission members arranged in a chain width direction perpendicular to the chain advancing direction for connecting the links in a mutually bendable manner, wherein said power transmission members comprise the end faces engaging in a power transmittable manner with sheave faces of pulleys, wherein said end faces comprise a shape formed by the grinding wheel so as to include bulging curved faces comprising a first end portion and a second end portion with respect to perpendicular directions perpendicular to the chain advancing direction and the chain width direction, wherein said bulging curved faces are formed in the half ovate spheroid shape, when viewed along the chain width direction, and maximum width portions of the bulging curved faces with respect to the chain advancing direction and the first end portions are relatively distant, and the maximum width portions and the second end portions are relatively near, wherein said first end portions correspond to a plurality of outer sides of a plurality of pulley radial directions, wherein a line of intersection between an arbitrary plane containing a predetermined reference axis and said bulging curved faces comprises an arcuate shape comprising a single radius of curvature on said arbitrary plane, wherein said predetermined reference axis is arranged close to the first end portions and outside of the connecting members and extends in the chain width direction, wherein an intersection line between an arbitrary arcuate plane on a center of the radius of curvature of the reference axis and an end face of the end faces is formed into an arcuate shape comprising a single radius of curvature in the arbitrary arcuate plane, wherein the radius of curvature of the intersection line becomes larger as the arcuate plane constituting the intersection line moves from one end portion of the perpendicular directions toward the center of the maximum width portion, and wherein the radius of curvature of the intersection line becomes smaller as the cylindrical plane constituting the intersection line moves from the center toward another end portion of the perpendicular directions.

4. A power transmission device comprising:

first and second pulleys including a pair of sheave faces of a conical shape confronting each other; and a power transmission chain according to claim 1 run between said pulleys for transmitting the power in engagement with the sheave faces.

5. A power transmission chain according to claim 1, wherein the second end portions are closer to the maximum width portion than the first end portions.

6. A power transmission chain according to claim 1, wherein the radius of curvature on said arbitrary plane increases from the first end portions to the maximum width portions and the radius of curvature on said arbitrary plane decreases from the maximum width portions to the second end portions.

7. A power transmission chain according to claim 1, wherein said connecting members include a plurality of types of members including a plurality of members and a plurality of other members, and wherein a width of a portion of the plurality of other members located between a maximum width position and the first end position thereof is greater than a width portion of the plurality of members located between the maximum width position and the first end position thereof.

8. A power transmission chain according to claim 7, wherein the plurality of members and the plurality of other members are arrayed in the chain advancing direction in a non-periodic sequence.

9. A power transmission chain according to claim 1, wherein an axis of greatest length of the half ovate spheroid shape intersects the first end portions and the second end portions.

10. A power transmission chain comprising:

a plurality of links arranged in a chain advancing direction; and a plurality of connecting members arranged in a chain width direction perpendicular to the chain advancing direction connecting the links in a mutually bendable manner, wherein said connecting members include a plurality of power transmission members comprising a plurality of end faces engaging in a power transmittable manner with a plurality of sheave faces of pulleys, and wherein said plurality of end faces include a plurality of bulging curved faces comprising a half ovate shape, including a first end portion and a second end portion with respect to perpendicular directions perpendicular to the chain advancing direction and the chain width direction, such that the bulging curved faces comprise an elliptical shape in a plane passing through the first end portion and the second end portion and extending in the chain width direction and a symmetrical shape around the plane, when viewed along the chain width direction, and wherein a radius of curvature of the bulging curved faces, in a direction perpendicular to the plane, increases from the first end portion to a maximum width portion of the bulging curved faces and decreases from the maximum width portion to the second end portion.

11. A power transmission chain according to claim 10, wherein the plurality of bulging curved faces include a first end portion and a second end portion with respect to a plurality of perpendicular directions perpendicular to the chain advancing direction and the chain width direction, and wherein a distance between a maximum width portion of the plurality of bulging curved faces, with respect to the chain advancing direction, and the first end portions is greater than a distance between the maximum width portion of the plurality of the bulging curved faces, with respect to the chain advancing direction, and the second end portions.

12. A power transmission chain according to claim 7, wherein a radius of curvature of the bulging curved faces of the plurality of members perpendicular to the chain advancing direction and the chain width direction is the same as a radius of curvature of the bulging curved faces of the plurality of other members perpendicular to the chain advancing direction and the chain width direction of the other member.

13. A power transmission chain according to claim 10, wherein said bulging curved faces are symmetrical about the plane which passes through the first end portion and the second end portion and extends in the chain width direction.

14. A power transmission chain according to claim 1, wherein said bulging curved faces are symmetrical about a plane which passes through the first end portion and the second end portion and extends in the chain width direction.

15. A power transmission chain according to claim 1, wherein a plane, which passes through the first end portion and the second end portion and extends in the chain width direction, is tilted in relation to a radial direction of the power transmission chain.

* * * * *